United States Patent
De Jong et al.

(10) Patent No.: US 11,425,918 B2
(45) Date of Patent: Aug. 30, 2022

(54) METHOD FOR PREPARING A MULTILAYER CONFECTIONARY PRODUCT

(71) Applicant: PERFETTI VAN MELLE S.p.A., Lainate (IT)

(72) Inventors: Petrus Henricus De Jong, Breda (NL); Hendricus Jacobus Catharina Hendrikx, Weert (NL); Tanja Catharina Jozefina Vleugels, Breda (NL)

(73) Assignee: PERFETTI VAN MELLE S.P.A., Lainate (IT)

( * ) Notice: Subject to any disclaimer, the term of this patent is extended or adjusted under 35 U.S.C. 154(b) by 265 days.

(21) Appl. No.: 16/475,966

(22) PCT Filed: Jan. 2, 2018

(86) PCT No.: PCT/EP2018/050027
§ 371 (c)(1),
(2) Date: Jul. 3, 2019

(87) PCT Pub. No.: WO2018/127474
PCT Pub. Date: Jul. 12, 2018

(65) Prior Publication Data
US 2019/0328001 A1    Oct. 31, 2019

(30) Foreign Application Priority Data

Jan. 4, 2017  (EP) .................................... 17150234

(51) Int. Cl.
*A23G 3/06* (2006.01)
*A23G 3/54* (2006.01)
(Continued)

(52) U.S. Cl.
CPC .......... *A23G 3/545* (2013.01); *A23G 3/0021* (2013.01); *A23G 3/0046* (2013.01);
(Continued)

(58) Field of Classification Search
CPC .. A23G 3/0019–3/0023; A23G 3/0046; A23G 3/0065–3/0068; A23G 3/0085;
(Continued)

(56) References Cited

U.S. PATENT DOCUMENTS 1,437,816 A * 12/1922 Paine ..................... A23G 3/366
426/48
3,857,963 A * 12/1974 Graff ..................... A23G 4/043
426/3
(Continued)

FOREIGN PATENT DOCUMENTS

| JP | 2001-231531 A | 8/2001 |
| JP | 2004-517627 A | 6/2004 |

(Continued)

OTHER PUBLICATIONS

International Search Report dated Mar. 14, 2018.
Office Action issued in Japanese Patent Application No. 2019-536588 dated Nov. 2, 2021.

*Primary Examiner* — Drew E Becker
(74) *Attorney, Agent, or Firm* — Nixon & Vanderhye

(57) ABSTRACT

Disclosed is a method for preparing a multilayer confectionary product including a paste confectionery center, surrounded by an intermediate layer of chewy candy material, surrounded in turn by a layer of amorphous candy material, to the multilayer confectionery product obtained by the process and to an apparatus for producing the multilayer confectionary product. The multilayer confectionary product can be further coated with a hard coating.

11 Claims, 3 Drawing Sheets

(51) Int. Cl.
  *A23G 3/34* (2006.01)
  *A23G 3/20* (2006.01)
  *A23P 20/20* (2016.01)
  *A23P 30/25* (2016.01)
(52) U.S. Cl.
  CPC ............. *A23G 3/0068* (2013.01); *A23G 3/06* (2013.01); *A23G 3/2015* (2013.01); *A23P 20/20* (2016.08); *A23P 30/25* (2016.08)
(58) Field of Classification Search
  CPC .. A23G 3/0089; A23G 3/0236–3/0247; A23G 3/06; A23G 3/2015; A23G 3/54–3/545; A23P 20/20–20/25; A23P 30/20–30/25
  See application file for complete search history.

(56) References Cited

U.S. PATENT DOCUMENTS

| | | | | |
|---|---|---|---|---|
| 3,922,360 | A * | 11/1975 | Sneath | A23G 3/48 426/573 |
| 4,888,192 | A * | 12/1989 | Ramnarine | A21C 3/04 426/448 |
| 4,938,128 | A * | 7/1990 | Knebl | A23G 3/06 425/130 |
| 6,056,988 | A * | 5/2000 | Bangerter | A23G 3/0226 426/576 |
| 6,623,266 | B2 | 9/2003 | Jani | |
| 7,332,186 | B2 * | 2/2008 | Jani | A23G 3/125 426/3 |
| 7,452,558 | B2 | 11/2008 | Jani | |
| 8,944,798 | B2 * | 2/2015 | Gimmler | B29C 48/18 425/133.1 |
| 2001/0019732 | A1 * | 9/2001 | Roussel | A23P 30/25 426/89 |
| 2002/0001665 | A1 * | 1/2002 | Barrett | A23G 3/346 426/661 |
| 2002/0136812 | A1 * | 9/2002 | Degady | A23G 3/54 426/516 |
| 2002/0142059 | A1 | 10/2002 | Jani | |
| 2003/0059501 | A1 * | 3/2003 | Rivier | A23G 3/50 426/103 |
| 2004/0037924 | A1 | 2/2004 | Jani | |
| 2004/0037925 | A1 | 2/2004 | Jani | |
| 2005/0191406 | A1 * | 9/2005 | Alexander | A23G 3/00 426/660 |
| 2006/0257549 | A1 | 11/2006 | Overly | |
| 2007/0141198 | A1 | 6/2007 | Yang | |
| 2007/0148285 | A1 * | 6/2007 | Yang | A23G 4/20 426/5 |
| 2009/0130251 | A1 * | 5/2009 | Perry | A23G 3/343 426/5 |
| 2011/0165290 | A1 | 7/2011 | Ashokan | |
| 2013/0209616 | A1 * | 8/2013 | Bottini | A23G 3/0068 426/91 |
| 2014/0147557 | A1 * | 5/2014 | Cotten | A23G 3/0065 426/103 |
| 2018/0000110 | A1 * | 1/2018 | Elejalde | A23G 3/54 |
| 2018/0103655 | A1 | 4/2018 | Requejo | A23G 3/50 |
| 2020/0100523 | A1 * | 4/2020 | Miller | A21C 9/061 |

FOREIGN PATENT DOCUMENTS

| | | |
|---|---|---|
| JP | 2007-222157 A | 9/2007 |
| JP | 2011-055810 A | 3/2011 |
| WO | WO02056697 A1 | 7/2002 |
| WO | WO2016102186 A1 | 6/2016 |

* cited by examiner

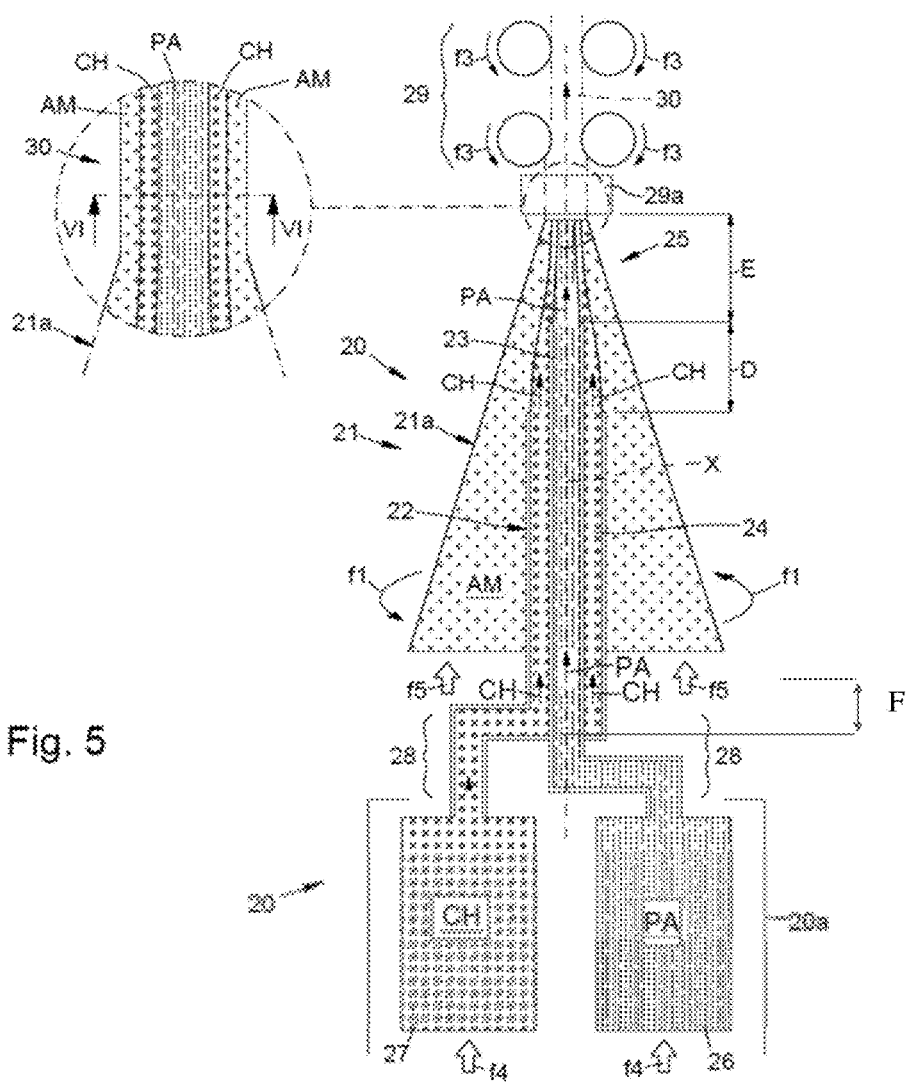
Fig. 5
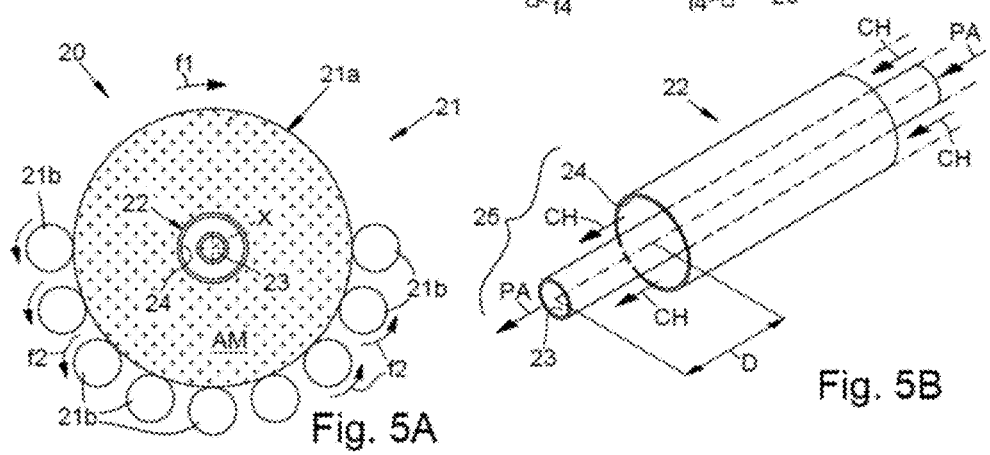
Fig. 5A
Fig. 5B

METHOD FOR PREPARING A MULTILAYER CONFECTIONARY PRODUCT

The present invention refers to a method for preparing a multilayer confectionary product comprising a paste confectionery center, surrounded by an intermediate layer of chewy candy material, surrounded in turn by a layer of amorphous candy material, to the multilayer confectionery product obtained by said process and to an apparatus for producing said multilayer confectionary product.

The multilayer confectionary product can be further coated with a hard coating.

Upon controlled storage, the paste confectionery center is converted into a viscous liquid and the amorphous candy material is at least partially crystallized. Thus, the invention refers also to a consumer confectionery product, made by a multilayer candy comprising a liquid filling, an intermediate chewy candy material, surrounded by at least partially crystallized candy material, optionally coated with a hard coating. The finished candies are characterized by a remarkable dimensional homogeneity and no leaking of the liquid filling.

BACKGROUND

Confectionary products with multiple layers and coatings are known, such as for example Mentos chewy candies, which have a chewy center and a coating, or Golia Activ Plus, which have a liquid filling and a hard amorphous candy layer surrounding it. However, the chewy candies present on the market, having a liquid filling, in particular those having a coating, fail to display regular shapes or dimensional homogeneity.

The product with liquid centers are usually produced providing the liquid center material, the candy material and pumping the liquid within a cone of candy material revolving in a batch roller, then deriving a filled rope that is formed through a chain die, or other kind of dies or through ball formers.

Chewy candy material can also be forced inside a cone of hard candy in a batch roller.

Confectionary products with a chewy center and a hard shell can also be produced by co-extrusion.

EP0724837 discloses a co-extrusion group for producing a rope with a center made of chewy material and a peripheral shell made of cooked sugar. The produced rope is conveyed to individualization and conformation unities to obtain products like dragees, tablets or pellets which are finally hard-coated and packaged for commercial distribution.

EP1845799 discloses a method of preparing a confectionary product by co-extruding a chewy material and a candy material to form a jacketed material wherein the chewy material is coated with the candy material. The jacketed material is then formed into individual pieces which are coated with a hard shell coating.

WO2016/102186 discloses a process for producing confectionary products of the type of lollipops consisting of a shell of hard candy and a liquid or semi-solid filling like a fondant. A hollow rope made of hard candy is produced by batch rolling or extrusion. A central pipe is used to fill the hollow area of the rope with a liquid or semi-solid material.

However, the known techniques used for producing a product with a multilayer structure having a paste center surrounded by chewy center and a hard shell cause technical problems.

In fact, when the co-extrusion process is applied to a chewy material and a paste material like a fondant for producing a rope of chewy material enveloping a center made of the paste material, and the coextruded part is inserted in a cone of hard amorphous candy, the results are not satisfactory. The fondant material, which has a semi-solid consistency, mixes with the chewy material at the exit of the co-extrusion nozzle resulting in the loss of the multiple layer structure.

BRIEF SUMMARY

It has now be found that these problems can be overcome by using, in the center of a cone of amorphous candy material, a particular nozzle which allows the extrusion of the chewy material as a hollow rope before the extrusion of the paste material inside the hollow rope. Surprisingly, in this way a rope is obtained with clearly differentiated concentric layers: a paste layer, a chewy candy layer and an amorphous candy layer. Without being bound to a theory, it is believed that extruding the chewy material before the paste material, allows for the frictional energy of the system, consisting of chewy material plus amorphous candy, to dissipate before the extrusion of the paste material. In this way, the chewy material is not forced to be mixed with the paste material.

The nozzle can be placed into a batch roller forming the outer layer of hard candy.

BRIEF DESCRIPTION OF THE DRAWINGS

FIG. 5 is a scheme of an apparatus of the invention for the production of the multilayer confectionary item of FIG. 2;

FIG. 5A is a schematic view of a batch roller with a revolving cone of amorphous candy material including a co-extruder nozzle of the apparatus of the invention of FIG. 5;

FIG. 5B is a perspective view of the co-extruder nozzle included in the apparatus of the invention of FIG. 5.

DETAILED DESCRIPTION OF THE INVENTION

Figure 1:
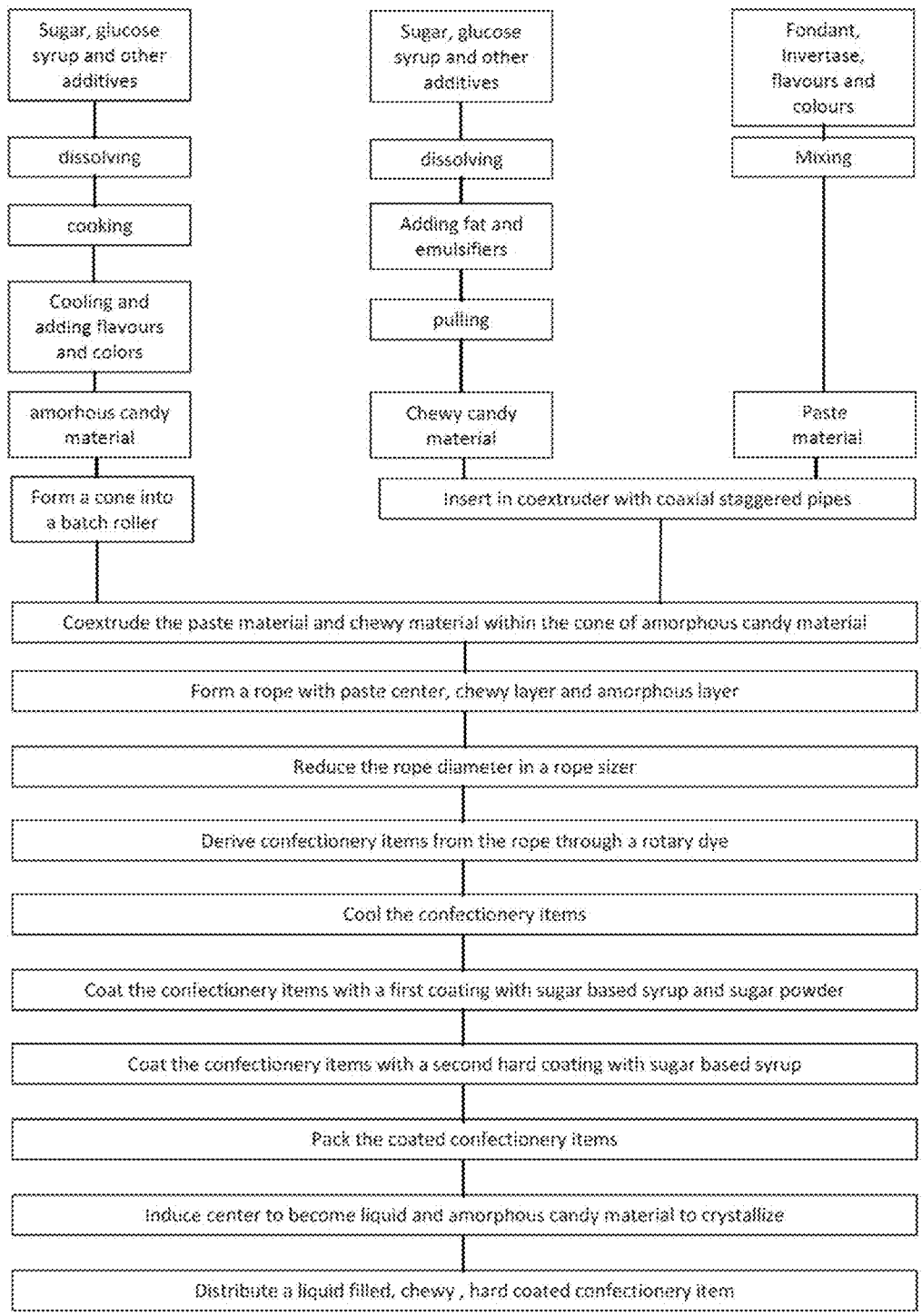
FIG. 1 is a flowchart showing the process steps of a method of the invention (in particular the method of claim 12) for preparing the multilayer confectionary items of the invention.

Object of the present invention is a method of preparing a confectionary product comprising the steps of:
a) providing an amorphous candy material (AM);
b) providing a chewy candy material (CH);
c) providing a paste confectionery material (PA);

d) processing the amorphous candy material (AM) to form a hollow rope;

e) co-extruding the chewy candy material (CH) and the paste confectionery material (PA) inside the amorphous candy material (AM) to form a rope (30) of confectionery material having three distinct regions consisting of a center (30a) of paste confectionery material (PA) surrounded by an intermediate layer (30b) of chewy candy material (CH), surrounded in turn by a layer (30c) of amorphous candy material (AM);

characterized in that the co-extrusion step is carried out by using a co-extrusion system (22) comprising a nozzle (25) made by two elongated pipes, respectively an inner pipe (23) and outer pipe (24), wherein the exit of the outer pipe (24) providing the chewy candy material (CH) and the exit of the inner pipe (23) providing the paste confectionery material (PA) are in an axially staggered position whereby the exit of the inner pipe (23) is in an advanced position compared to the exit of the outer pipe (24) and the distance D between the exit of the inner pipe (23) and the exit of the outer pipe (24) is ≥10 cm.

Figure 2:
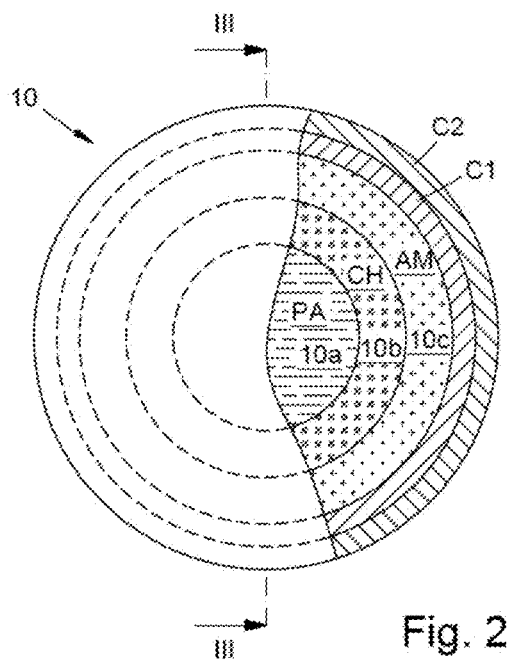
FIG. 2 is a plant schematic view, partially in section, of a multilayer confectionary item of the invention produced with the method of FIG. 1, before inducing the paste center to become liquid and the amorphous candy to crystallize.
Figure 3:
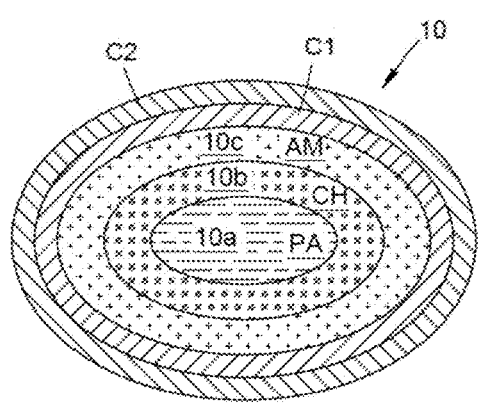
FIG. 3 is a schematic view in cross section, along the line III-III of FIG. 2, of the multilayer confectionary item produced with the method of the invention, before inducing the paste center to become liquid and the amorphous candy to crystallize.
Figure 4:
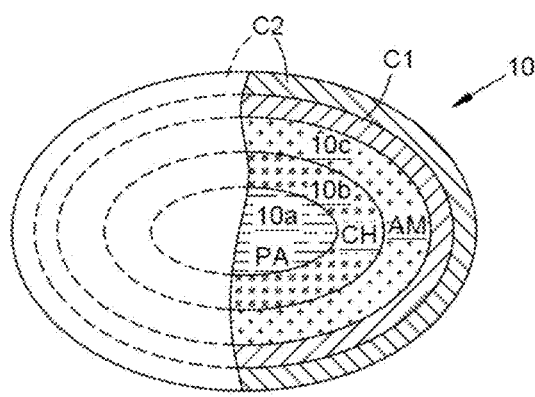
FIG. 4 is a side schematic view, partially in section, of the multilayer confectionary item of FIGS. 2 and 3 produced with the method of the invention, before inducing the paste center to become liquid and the amorphous candy to crystallize.
Figure 6:
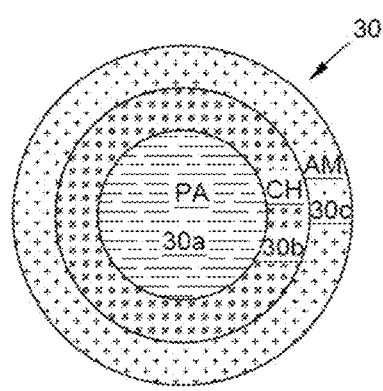
FIG. 6 is a schematic view in cross section, along the line VI-VI of FIG. 5, of a rope of confectionary material which is produced with the apparatus of FIG. 5.

The apparatus used in the above reported method is shown in FIG. 5. The apparatus indicated in general with (20), has a co-extruder (22) which in turn comprises an inner pipe (23) and an outer pipe (24) that define a nozzle (25), wherein the inner pipe (23) is provided for being fed with the paste material PA which is used for forming the center (10a) of the confectionery item (10), as shown in FIGS. 2-4, and the outer pipe (23) is provided for being fed with the chewy candy material (CH) which is used for forming the intermediate layer (10b) of the same confectionery item (10), so as to form, at the exit of the apparatus (20), a rope (30) of confectionery material, exhibiting in section three distinct regions (30a, 30b, 30c), as shown in FIG. 6, corresponding respectively to the center (10a) of paste confectionery material (PA), to the intermediate layer (10b) of chewy candy material (CH), and to the further layer (10c) of amorphous hard candy material (AM) of the confectionery item (10), as also described in the following in a more detailed way.

Preferably the inner pipe (23) and the outer pipe (24) of the co-extruder 22 are coaxial and the three distinct regions (30a, 30b, 30c) of the rope (30) of the confectionery material are concentric.

The distance, (D in FIGS. 5 and 5B), between the exit of the outer pipe (24) and the exit of the inner pipe (23) is such as to prevent mixing together the chewy confectionery material (CH) with the paste material (PA).

In particular the nozzle (25) consists of the two coaxial pipes (23, 24), wherein the outer pipe (24) has a diameter of from 20 mm to 150 mm, preferably from 50 mm to 100 mm, more preferably from 65 mm to 80 mm and the inner pipe (23) has a diameter of from 10 mm to 50 mm, preferably from 20 mm to 40 mm.

The distance D between the exit of the inner pipe (23) and the exit of the outer pipe (24) is preferably from 10 cm to 150 cm, more preferably from 20 cm to 130 cm.

Preferred ranges are also 10 cm to 80 cm, from 30 cm to 50 cm and from 80 to 120 cm.

A batch roller (21) may be used for processing the cooked mass of amorphous candy material (AM) to form the hollow rope.

The above defined method may further comprise the following steps of:

f) cutting the rope (30) of confectionery material having three distinct regions (30a, 30b, 30c) into confectionery items; and g) applying an optional first coating (C1) comprising syrup and particulate confectionery material to the confectionery items; and/or h) applying an outer hard coating (C2) over the first coating (C1) or over the confectionery items to give coated confectionery items (10).

For the scope of the present invention, by "amorphous candy material" (AM) it is intended a material which is substantially non crystalline. In particular, the amorphous candy material (AM) contains less than 10% sugar crystals, preferably less than 5% sugar crystals and even more preferably less than 3% sugar crystals (percentages by weight of the amorphous candy material).

Sugar seeds may be added to the amorphous candy material (AM) just before the extrusion process.

The chewy candy material (CH) preferably comprises sugar, glucose syrup, fat and at least one hydrocolloid such as alginic acid, sodium alginate, potassium alginate, calcium alginate, agar, carrageenan, cellulose, modified cellulose, curdlan, gellan gum, guar gum, gum arabic, native starch, modified starch, xanthan gum, locust bean gum, pectin, gelatin, pea protein or other vegetable proteins and combinations thereof.

The chewy candy material (CH) can also include emulsifiers.

The paste material (PA) preferably comprises fondant and at least one compound able to hydrolyse sucrose to produce glucose and fructose.

In the present invention, the term "fondant" refers to confectionery products containing sugar crystals mixed and held together in two phases.

In particular, the sugar crystals that constitute the solid phase are dispersed in a sugar syrup with high solid content.

The structure of the fondant is semi-solid because the quantity of the liquid syrup wherein the solid sugar crystals are present is relatively low compared with that of the solid sugar crystals.

Instead of a sugar syrup, a glucose syrup can be used for the liquid phase of the fondant.

In the fondant mixture according to the invention, sugar hydrolysis, namely the reaction that produces invert sugar in the liquid state, may be obtained by using acids, enzymes or any other chemical hydrolysis reaction suitable to produce glucose and fructose from sucrose.

The invertase enzyme included in the fondant mixture used in the process according to the invention can be selected, for example, from the enzymes usually known to the persons skilled in the art such as: fructosylinvertase, alkaline invertase, acid invertase, glucosucrase, beta-h-fructosidase and beta-fructosidase.

In a preferred embodiment of the present invention, the invertase enzyme is β-fructofuranosidase.

In the context of the present invention, the term "fondant mixture" indicates and refers to a homogenous mixture of a sucrose-based fondant and an enzymatic solution of invertase enzyme.

The fondant mixture can additionally contain other additives. Preferably the fondant mixture does not contain hydrocolloids like: as alginic acid, sodium alginate, potassium alginate, calcium alginate, agar, carrageenan, cellulose, modified cellulose, curdlan, gellan gum, guar gum, gum arabic, native starch, modified starch, xanthan gum, locust bean gum, pectin, gelatin, pea protein or other vegetable proteins and combinations thereof.

The first coating (C1) preferably comprises sugar. Preferably, it also comprises glucose syrup, binding agents like starches, gum arabic, gelatin, gellan, cellulose, modified cellulose, flavours and colours.

The outer hard coating (C2) preferably comprises sugar. Preferably, it also comprises glucose syrup, binding agents like starches, gum arabic, gelatin, gellan, cellulose, modified cellulose, flavours, colours and polishing agents. Preferred polishing agents are carnauba wax, beeswax, shellac, fats and oils. The hard or soft coating can also contain emulsifiers.

Suitable emulsifiers for the chewy candy material (CH) or the coatings (C1, C2) are: arabic gum, mono- and di-glycerides of fatty acids, acetylated mono- and di-glycerides of fatty acids, lecithin, monosodium salts of phosphorylated mono- and di-glycerides, polyglycerol esters of fatty acids, sucrose esters of fatty acids, sorbitan monoesters of fatty acids (span), polyethoxylated sorbitan esters of fatty acids (tween) and mixtures thereof.

Flavours, colours and other additives may be present in each layer of the confectionary product 10.

The colours used in the may include natural food colours, natural pigments, artificial colours, lake colours, and combinations thereof.

The flavours may include essential oils, aromatic preparations, natural flavouring substances, artificial flavours and combinations thereof.

The amorphous candy material (AM) is preferably cooled, after cooking, on a kneading table, cooling belt or cooling tunnel and is fed into the batch roller (21) at a temperature from 40° C. to 70° C.

The chewy material (CH) is cooled after cooking, preferably pulled, eventually added with sugar crystals and fed into the outer pipe (24) of the co-extrusion system (22) at a temperature from 20° C. to 55° C.

The paste material (PA) is fed into the inner pipe (23) of the co-extrusion system (22) at a temperature from 10° C. to 50° C.

The process may comprise the step of packing the coated confectionery items.

The method of the invention may further comprise the steps of:
i) inducing the amorphous candy material (AM) to at least partially crystallize;
l) inducing the paste material (PA) to at least partially liquefy.

Preferably the steps i) and l) are carried out together over a time of from 5 to 30 days at a temperature from 20° C. to 50° C., preferably from 7 to 20 days at a temperature from 25° C. to 35° C.

In case the paste material (PA) is a fondant mixture, the final product offered for sale and consumption will have a filling in liquid form, due to the effect of invertase enzyme, present in the original fondant mixture. The invertase enzyme, when a certain time has elapsed after the co-extrusion process, converts the original semi-solid sugar-based fondant to a liquid form. In the preferred embodiment wherein the fondant mixture does not contain hydrocolloid, the viscosity of the filling is reduced compared to a filling with hydrocolloid.

As already anticipated, another relevant object of the present invention is an apparatus, as illustrated in FIG. 5, for the manufacture of a confectionery material consisting in a rope (30) of confectionery material having three distinct regions, consisting of a paste confectionery center (30a) of paste confectionary material PA, surrounded by an intermediate layer (30b) of chewy candy material (CH), surrounded in turn by a layer (30c) of amorphous candy material (AM), said apparatus comprising:

a) a batch roller (21) that can accommodate the amorphous candy material (AM) in the form of a revolving cone (21a);
b) a co-extruder (22) with two inlets for the paste confectionery material (PA) and the chewy candy material (CH) and a nozzle (25), that allows the paste confectionary material (PA) and chewy candy material (CH) to exit the co-extruder (22), said nozzle (25) being positioned in the center of the batch roller (21), about on the axis of the revolving cone (21a) of the amorphous candy material (AC), and extruding the paste confectionary material (PA) and chewy candy material (CH) in the direction of the apex of the revolving cone (21a) of the amorphous candy material (AM).

characterized in that said nozzle (25) is made by two elongated pipes, an outer pipe (24) and an inner pipe (23), wherein the exit of the outer pipe (24) providing the chewy candy material (CH) and the exit of the inner pipe (23) providing the paste confectionery material (PA) are in an axial staggered position, as indicated with D in FIGS. 5 and 5B, whereby the exit of the inner pipe (23) is in an advanced position compared to the exit of the outer pipe (24) and the distance D between the exit of the inner pipe (23) and the exit of the outer pipe (24) is ≥10 cm.

Preferably the outer pipe (24) and the inner pipe (23) are coaxial.

In the above defined apparatus (20) the outer pipe (24) has a diameter of from 20 mm to 150 mm, preferably from 50 mm to 100 mm, more preferably from 65 mm to 80 mm, the inner pipe (23) has a diameter of from 10 mm to 50 mm, preferably from 20 mm to 40 mm. The distance (D) between the exit of the inner pipe (23) and the exit of the outer pipe (24) is preferably from 10 cm to 150 cm, more preferably from 20 cm to 130 cm.

Preferred ranges are also from 10 cm to 80 cm, from 30 cm to 50 cm and from 80 to 120.

The batch roller (21), shown schematically in FIGS. 5 and 5A, is substantially of known type and is suitable to cause the rotation of the revolving cone (21a), formed by the amorphous candy material (AM), around the axis X of the apparatus (20) and of the respective co-extruder (22), as indicated by arrows f1.

In particular the batch roller (21) comprises a lot of peripheral rollers (21b), partially surrounding the external conical surface of the revolving cone (21a), all rotating in the same sense as indicate by arrows f2 in FIG. 5A, which are designed to contain the amorphous candy material (AM) forming the revolving cone (21a) and to cooperate into contact with the respective external conical surface so as to drive the rotation of the revolving cone (21a) around the axis X.

The apparatus (20) further comprises a cross wheel (29a) and a set of sizing wheels, indicated in the whole with 29, suitable to rotate as shown by arrows f3 in FIG. 5, for sizing the rope (30) which is produced by the apparatus (20) at the exit of the batch roller (21), wherein the cross wheel is placed at the end of the batch roller (21) at the apex of the cone of the amorphous candy material (AM).

The distance E between the cross wheel and co-extruder exit of the inner pipe (23) is from 10 cm to 100 cm, preferably from 30 cm to 80 cm, more preferably from 40 to 60 cm.

The length of the inner pipe and of the outer pipe is measured starting from the exit of the extruder body, which can be placed in a first embodiment in correspondence of the beginning of the batch roller or, in a second embodiment, slightly detached from the beginning of the batch roller (see FIG. 5, letter F). In the second embodiment the distance E is calculated subtracting the length of the inner pipe from the sum of the batch roller length plus the distance F.

Moreover, as shown schematically in FIG. 5, the paste confectionary material (PA) and the chewy candy material (CH) are stored in the apparatus (20) in two respective compartments (26, 27), associated with a fixed structure (20a) of the same apparatus (20), from which compartments (26, 27) the paste confectionary material (PA) and the chewy candy material (CH) are supplied, in a known manner, i.e. through screws and suitable tubular connections of known configuration, indicated in the whole with 28, respectively to the inlet of the inner pipe (23) and to the inlet of the outer annular pipe (24) of the co-extruder (22).

In particular, suitable means, schematized with arrows f4 in FIG. 5, are provided for pushing the paste confectionary material (PA) and the chewy candy material (CH), contained in the respective compartments (26, 27), so as to cause these materials to flow through the connections (28) and thereby feed the respective pipes (23) and (24).

Similarly the amorphous candy material (AM), contained in the batch roller (21) and forming the revolving cone (21a), is pushed by the gravity force, as schematized by arrows f5, so as to advance in order to surround the chewy candy material (CH) and the paste confectionary material (PA) extruded by the co-extruder (22) and thereby form the rope (30) at the exit of batch roller (21).

Object of the present invention is also the confectionery product obtained by the process as defined above, in particular a confectionery product comprising:
I) a center of paste confectionary material (PA);
II) an intermediate layer of chewy candy material (CH);
III) a layer of amorphous candy material (AM).

A further object of the invention is a confectionary item (10), obtained by the process as defined above, comprising:
I) a center (10a) of paste confectionary material (PA);
II) an intermediate layer (10b) of chewy candy material (CH);
III) a layer (10c) of amorphous candy material (AM);
IV) an optional first coating (C1) comprising syrup and particulate confectionery material and/or
V) an outer hard coating (C2).

In particular the layer III) can be induced to crystallizes over time, while the layer I) can be induced to liquefy over time. Thus, an additional object of the present invention is a multilayer confectionary item comprising:
I) a viscous liquid confectionary center;
II) an intermediate layer of chewy candy material surrounding the viscous liquid confectionary center;
III) a layer of at least partially crystallized candy material surrounding the intermediate layer of chewy candy material;
IV) an optional first coating comprising syrup and particulate confectionary material and/or
V) an outer hard coating.

The intermediate layer of chewy candy material in the multilayer confectionary item, as above defined, may be a fully crystallized or partially crystallized candy material.

The multilayer confectionary items, as above defined, are candies characterized by a remarkable dimensional homogeneity and no leaking of the liquid filling. The optional first coating comprising syrup and particulate confectionary material and/or the outer hard coating is/are applied preferably within one week after the production of the centers, preferably within four days and still preferably within two days.

The items are subject to mechanical stress during coating, which can deform the centers and give final pieces that are slimmer or thicker than a target dimension. It is believed that coating the items within the time above allows the item to be not deformed or deformed by a negligible extent. Those not deformed coated items are less susceptible of leaking the liquid center and are also easy to pack.

Deformation can be, for example, evaluated by measuring the total thickness of a multitude of coated confectionery items piled one over the other.

Given a target total thickness of 14 pieces of the coated confectionery items of the invention, the measured thickness of 14 coated confectionery items of the invention is preferably within ±5% of the target total thickness, more preferably within ±3% even more preferably within ±1%.

In order to have a perceived effect of the liquid filling and a dimensionally stable confectionery items the percentages of the three layers of the items are preferably: paste filling from 15% to 25%, chewy material from 27% to 37% and amorphous candy material from 23% to 33% (the percentages are by weight over the weight of the confectionery item before coating).

EXAMPLES

Example 1: Preparation of the Amorphous Candy Material

| Ingredients | kg wet | % wet | kg final | % final |
|---|---|---|---|---|
| Sugar | 60.0 | 40.0 | 60.0 | 47.4 |
| Glucose syrup | 70.0 | 46.7 | 59.5 | 47.0 |
| Mint Flavour | | 0 | 0.1 | 0.1 |
| Sugar seeding | | 0.0 | 2.0 | 1.6 |
| Water | 20.0 | 13.3 | 5.1 | 4.0 |
| Total | 150.0 | 100.0 | 126.7 | 100.0 |

The above reported amounts of sugar, glucose syrup and water in the column "kg wet" are the initial quantities of the raw materials before cooking. They were added at room temperature in a steam jacketed cooker. The mixture was heated under stirring to 140° C. and vacuum was applied for 6 minutes to give a final total moisture content of about 4%. The obtained amorphous sugar candy material was combined with the mint flavour under gentle stirring. Sugar seeding were added before the extrusion with the other candy components.

Example 2: Preparation of the Chewy Candy Material

| Ingredients | kg wet | % wet | kg final | % final |
|---|---|---|---|---|
| Sugar | 82.5 | 37.2 | 82.5 | 42.7 |
| Glucose syrup | 97.5 | 43.9 | 78.0 | 40.4 |
| Mint Flavour | | | 0.6 | 0.3 |
| Gelatin and lecithin solution | 10.5 | 4.7 | 2.1 | 1.1 |
| Coconut Fat | 10.5 | 4.7 | 10.5 | 5.4 |
| Water | 21.0 | 9.5 | 19.3 | 10.0 |
| Total | 222.0 | 100.0 | 193.0 | 100.0 |

The above reported amounts of sugar, glucose syrup and water were added at room temperature in a steam jacketed cooker. The obtained mixture was heated under stirring to 130° C. and vacuum was applied for 4 minutes to give a final moisture content of about 10%. The fat, gelatin and lecithin solution was added to the mixture and the formulation was pulled for 30 minutes to yield the final chewy candy material.

Example 3: Preparation of the Paste Confectionery Material

| Ingredients | kg final | % final |
|---|---|---|
| Sugar based fondant | 100.00 | 98.47 |
| Mint Flavour | 0.50 | 0.49 |
| Invertase preparation | 1.00 | 0.98 |
| Blue colour 10% | 0.05 | 0.05 |
| Total | 101.55 | 100.00 |

Sugar based fondant consists of 70% sugar, 16% glucose syrup and 14% water

Invertase preparation is a solution of β-fructofuranosidase at 30000 units/ml.

The sugar based fondant was added into an oil heated mixer and gently heated to softness while mixing. Mint flavour, colour and invertase preparation were added to give the final paste confectionery material.

Example 4: Syrup for the Hard Coating

| Ingredients | kg final | % final |
|---|---|---|
| Sugar | 75.0 | 73.2 |
| Mint Flavour | 0.5 | 0.5 |
| Gum arabic | 2.0 | 2.0 |
| Water | 25.0 | 24.4 |
| Total | 102.5 | 100.0 |

Sugar and water were added to a steam-jacketed cooker and the temperature was raised to 120° C. under stirring. Steam was turn off and colloids were added to give the final syrup for hard coating.

Example 5: Preparation of Multilayers Candies

Total length of the outer pipe for the chewy candy material (Teflon): 100 cm
Total length of the inner pipe for the paste confectionary material (teflonated Stainless steel): 200 cm
Total length batch roller: 220 cm
Distance between Cross wheel and end of inner pipe: 53 cm
Distance between co-extruder and batch roller: 33 cm An apparatus as illustrated in FIG. 5, comprising a batch roller (21) and a nozzle (25) mounted on the exit of a co-extruder separated from said batch roller, with the nozzle being made by two coaxial and elongated pipes, the outer pipe (24) having a length of 100 cm and a diameter of 65 cm, and the inner pipe (23) having a length of 200 cm and a diameter of 35 cm, was used for preparing a rope (30) with three concentric areas (30a, 30b, 30c), from outside to inside: cooked amorphous candy material, chewy candy material, paste confectionery material.

The nozzle (25) was positioned in the center of the batch roller (21) about on the axis of the revolving cone (21a) of the amorphous candy material so as the first and second confectionery material were extruded in the direction of the apex of the revolving cone (21a).

The distance (D) between the exit of the inner pipe (23) and the exit of the outer pipe (24) was 100 cm.

The amorphous candy material obtained in Example 1 was cooled on a cold table and fed to a batch roller (21) to form a revolving cone of amorphous candy material (21a) at temperature of 50° C. The batch roller (21) terminates with a cross-wheel that pulls the rope of confectionery material out of the batch roller (21).

The chewy candy material obtained in Example 2 was fed into a co-extruder hopper and co-extruded (i.e. it was fed in the outer pipe (24) of the co-extrusion system) at 40° C. through the outer pipe (24) of the co-extruder (22), placed inside the revolving cone (21a) of the amorphous candy material.

At the same time, the paste confectionery material obtained in Example 3 was fed into a co-extruder hopper and co-extruded (i.e. it was fed in the inner pipe (23) of the co-extrusion system) at 30° C. through the inner pipe (23) of the co-extruder (22).

The three materials formed together a rope (30) with three concentric areas, from outside to inside: amorphous candy material (30c), chewy candy material (30b), paste confectionery material (30a).

The rope (30) was sized through a series of five sizing rollers and fed into a chain moulding apparatus. The chain moulding apparatus delivered individual items of candies.

Each item had three concentric region: an inner region of paste material (10a) completely surrounded by a region of chewy candy material (10b), completely surrounded in turn by a region of amorphous candy material (10c).

The centers were cooled in a cooling tunnel with controlled air temperature and relative humidity. At the end of the tunnel the centers were collected in trays and stored.

The stored centers are then inserted in a coating pan where they were coated with the hard coating technique. Initially a first coating (C1) was applied using syrup and powder sugar (the application was repeated 10 times), then a second coating (C2) with syrup was applied (the application is repeated 20 times).

In the last applications the coating syrup was diluted to smoothen the coating and a polishing agent like carnauba wax was added to provide the final shine and decrease the environmental moisture pick up by the coating.

Finally the candies were stored at 30° C. for 15 days to induce the crystallization of the amorphous candy and the inversion of the sugar of the paste material to give a soft or viscous liquid center.

The candies were obtained using the following amounts of the ingredients:

| | % | g |
|---|---|---|
| Paste confectionery material (Ex. 3) | 25 | 0.53 |
| Chewy confectionery material (Ex. 2) | 40 | 0.84 |
| Amorphous confectionery material (Ex. 1) | 35 | 0.74 |
| Total Center | 100 | 2.10 |
| Extra-weight coating | 25 | 0.7 |
| Final candy weight (g) | | 2.8 |
| Height of 14 pieces in mm (target 130 mm) | | 131 |
| Sensorial evaluation | Crunchy shell, nice chew, with filling sensation | |

Example 6 and 7 of the Invention and 8 of Comparison

The same method of Example 5 was used varying some parameters of the co-extrusion system as reported in the following table.

The amounts of the cooked amorphous candy material, chewy candy material, paste confectionery material were those reported in Example 5. The length of the outer pipe and of the inner pipe, the distance of the extruder from the batch roller and the distance of the inner pipe from the final cross wheel are varied.

| Parameters | Example 6 | Example 7 | Example 8 (comparative) |
|---|---|---|---|
| Length of batch roller | 220 | 220 | 220 |
| Length of outer pipe | 100 | 80 | 132 |
| Length of inner pipe | 200 | 210 | 140 |
| Distance exit inner pipe-cross wheel (E) | 30 | 50 | 110 |
| Distance exit inner pipe-exit outer Pipe (D) | 100 | 130 | 8 |
| Distance exit outer pipe-cross wheel | 130 | 180 | 118 |
| Distance extruder batch roller (F) | 10 | 40 | 30 |
| Outcome | Well formed triple region candy centers | Well formed triple region candy centers | chewy candy and filling are not defined, mixed together |

The invention claimed is:

1. A method of preparing a confectionary product comprising the steps of:
   a) providing an amorphous candy material (AM);
   b) providing a chewy candy material (CH) which is a fully or partially crystallized candy material;
   c) providing a paste confectionery material (PA) comprising a semi-solid fondant wherein a quantity of liquid syrup is less than a quantity of solid sugar crystals, and at least one compound able to hydrolyse sucrose to glucose and fructose;
   d) processing the amorphous candy material (AM) to form a hollow rope;
   e) co-extruding the chewy candy material (CH) and the paste confectionery material (PA) inside the amorphous candy material (AM) to form a rope (30) of confectionery material having three distinct regions consisting of a paste confectionery center (30a), surrounded by an intermediate layer (30b) of chewy candy material (CH), surrounded in turn by a layer (30c) of amorphous candy material (AM);
   wherein the co-extrusion step is carried out by using a co-extrusion system (22) comprising a nozzle (25) made by two coaxial elongated pipes, respectively an inner pipe (23) and outer pipe (24), wherein the exit of the outer pipe (24) providing the chewy candy material (CH) and the exit of the inner pipe (23) providing the paste confectionery material (PA) are in an axially staggered position (D) whereby the exit of the inner pipe (23) is in an advanced position compared to the exit of the outer pipe (24) and the distance D between the exit of the inner pipe (23) and the exit of the outer pipe (24) is ≥10 cm, thereby to prevent mixing of the chewy candy material (CH) with the paste confectionery material (PA).

2. The method according to claim 1 wherein the three regions (30a, 30b, 30c) of the rope (30) of confectionary materials (PA, CH, AM) are concentric.

3. The method according to claim 1 wherein the outer pipe (24) has a diameter of from 20 mm to 150 mm and the inner pipe (23) has a diameter of from 10 mm to 50 mm and the distance (D) between the exit of the inner pipe (23) and the exit of the outer pipe (24) is from 10 cm to 150 cm.

4. The method according to claim 1 wherein the amorphous candy material (AM) is processed into a hollow rope by a batch roller (21).

5. The method according to claim 1 further comprising the steps of:
   f) cutting the rope (30) of confectionery material having three distinct concentric regions (30a, 30b, 30c) into confectionery items;
   g) applying a first coating (01) comprising syrup and particulate confectionery material to the confectionery items;
   h) applying a hard coating (C2) over the first coating (C1) to yield coated confectionery items.

6. The method according to claim 1, wherein the amorphous candy material (AM) comprises sugar and glucose syrup.

7. The method according to claim 1, wherein the chewy candy material (CH) comprises sugar, glucose syrup, fat and at least one hydrocolloid.

8. The method according to claim 4, wherein the amorphous candy material (AM) is fed into the batch roller (21) at a temperature from 40° C. to 70° C.

9. The method according to claim 1, wherein the chewy material (CH) is fed into the outer pipe (24) of the co-extrusion system (22) at a temperature from 20° C. to 55° C.

10. The method according to claim 1, wherein the paste material (PA) is fed into the inner pipe (23) of the co-extrusion system (22) at a temperature from 10° C. to 50° C.

11. The method according to claim 5 further comprising the steps of:
   i) inducing the amorphous candy material (AM) to at least partially crystallize;
   l) inducing the paste material (PA) to at least partially liquefy.

* * * * *